United States Patent [19]

Walton

[11] 4,223,830
[45] Sep. 23, 1980

[54] IDENTIFICATION SYSTEM

[76] Inventor: Charles A. Walton, 19115 Overlook Rd., Los Gatos, Calif. 95030

[21] Appl. No.: 934,951

[22] Filed: Aug. 18, 1978

[51] Int. Cl.² ............ G06K 5/00; G06K 19/06; H04Q 9/02; G01S 9/56
[52] U.S. Cl. ............ 235/380; 235/488; 340/152 T; 343/6.5 R
[58] Field of Search ............ 235/439, 376, 382, 419, 235/375, 380, 488; 340/280, 224, 152 T; 343/6.5 R, 6.8 R

[56] References Cited

U.S. PATENT DOCUMENTS

| | | | |
|---|---|---|---|
| 3,299,424 | 1/1967 | Vinding | 235/439 |
| 3,438,489 | 4/1969 | Cambornac et al. | 209/576 |
| 3,665,448 | 5/1972 | McGlinchey et al. | 235/439 |
| 3,679,874 | 7/1972 | Fickenscher | 235/454 |
| 3,752,960 | 8/1973 | Walton | 235/439 |
| 3,755,803 | 8/1973 | Cole et al. | 235/439 |
| 3,816,708 | 6/1974 | Walton | 235/439 |
| 3,828,337 | 8/1974 | Lichtblau | 340/152 |
| 3,832,530 | 8/1974 | Reitboeck et al. | 340/439 |
| 3,906,460 | 9/1975 | Halpern | 235/439 |
| 3,929,277 | 12/1975 | Byrne et al. | 235/376 |
| 4,025,791 | 5/1977 | Lennington et al. | 250/341 |
| 4,047,156 | 9/1977 | Atkins | 340/171 A |

*Primary Examiner*—Daryl W. Cook
*Attorney, Agent, or Firm*—Gerald L. Moore

[57] ABSTRACT

An electronic identification and recognition system including a portable radio frequency signal generator having a circuit for repeatedly generating and transmitting an identifying signal having predetermined characteristics of frequency and pulse length.

A single crystal determines the radio frequency signal and the two modulating square wave rates, and the bit data rate, so that synchronism with a remote receiver is readily obtained. A low level of transmitting power is chosen to allow non-interfering transmission on a variety of radio frequencies, and also to allow significant circuit simplifications and economics.

Transmission may be initiated by push button or by interrogation from the central receiver station.

A receiver receives and synchronously decodes the transmitted signal.

13 Claims, 7 Drawing Figures

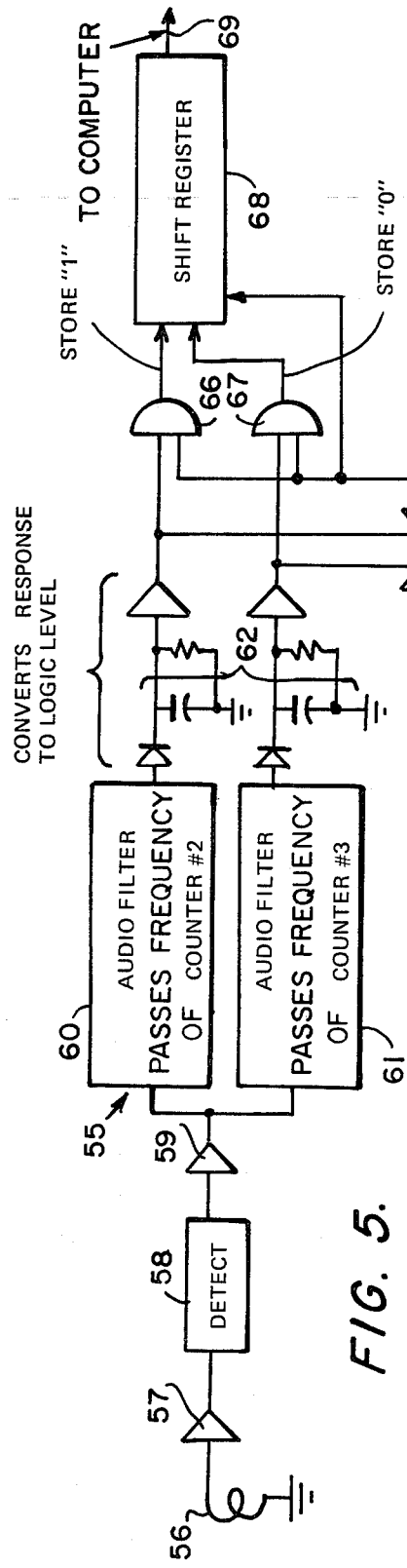
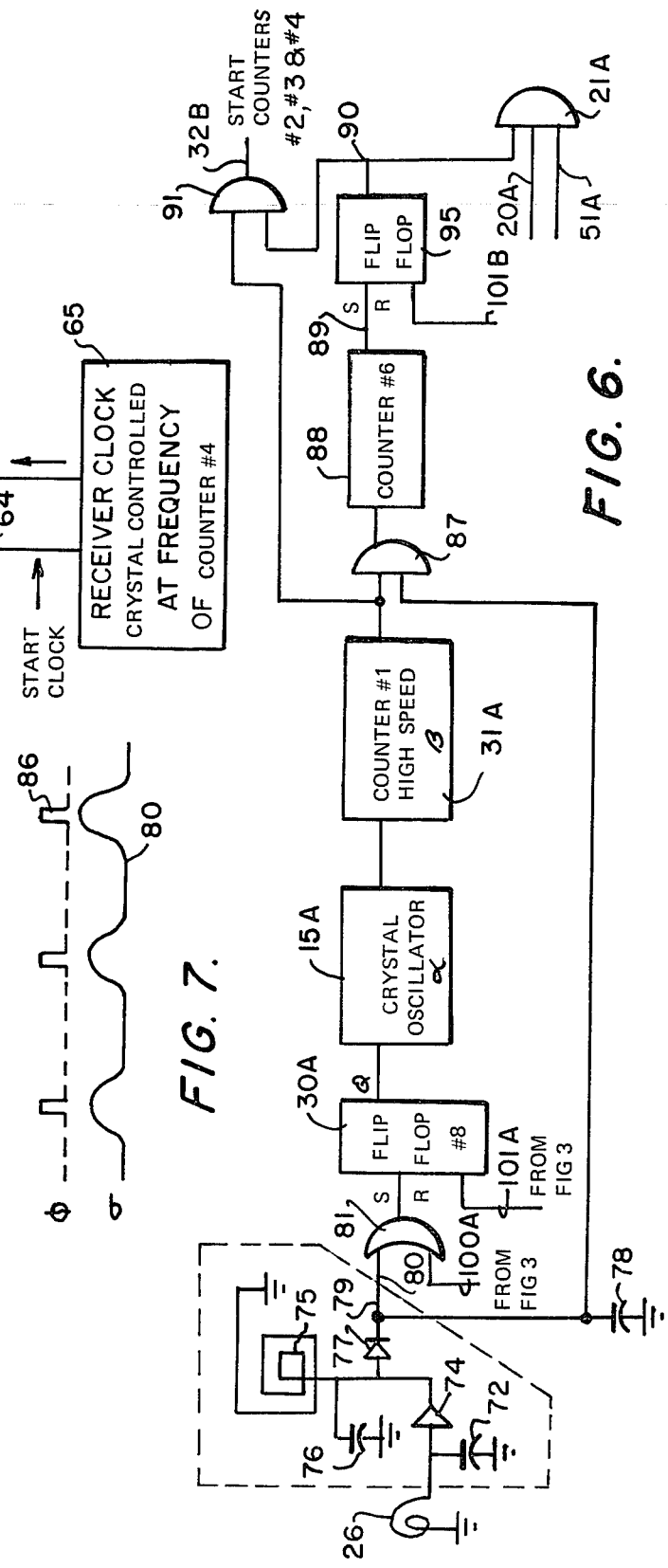
FIG. 5.
FIG. 7.
FIG. 6.

IDENTIFICATION SYSTEM

BACKGROUND OF THE INVENTION

The present invention relates to an electronic system for identification and recognition of an object or person. Prior to the advent of electronic identifying systems, the primary means to carry out such functions has included visual identification, signature comparison, fingerprints and the like. Following this there have been developed various cards which are inserted into slots and which have identifying characteristics to be recognized by the receiver.

More recently there have been developed systems using a small portable device which may have a credit card shape and which need not be inserted into a slot. Examples of these are U.S. Pat. No. 3,438,489, Automatic Sorting System For Articles Such As Mailbags, issued Apr. 15, 1969; U.S. Pat No. 3,752,960, Electronic Identification & Recognition System, issued Aug. 14, 1973; U.S. Pat. No. 3,832,530, Object Identifying Apparatus, issued Aug. 27, 1974; U.S. Pat. No. 4,025,791, Object Identifying System, issued May 24, 1977; and U.S. Pat. No. 4,047,156, Reactively Decoupled Dual Channel Keying Circuit For Wide-Band Frequency Modulated Keyable Control Circuit, issued Sept. 6, 1977. Some shortcomings of the aforementioned systems include low code capacity, high radiated power requirements, the inability to penetrate opaque surfaces, and complexity and cost high enough to limit their widespread use.

It is the purpose of this invention to overcome the aforementioned objections and provide an economical device which is programmable, uses low power and is low in cost. The present invention has particular application in credit or cash checking recognition systems and the like, in which the identifier can be individually programmed in a multitude of ways, each separately distinguishable so that the system can handle a large number of accounts or identifiable objects. It is another purpose of the present invention to provide a system which can be programmed for separate identification of a very large number of signal generating identifiers, in a simple, economical and reliable manner.

SUMMARY OF THE INVENTION

An electronic identification system comprising a signal generating identifier and a receiver. The identifier includes a portable power source and a first generator for generating a signal having a predetermined frequency. A second generator receives the first signal and generates a plurality of resultant signals therefrom which are transmitted in a preselected order and at preselected time intervals in accordance with a preselected program. The receiver receives and decodes the signal to determine the identity of the transmitter to authorize consequent decisions concerning the identification.

The rate of data transmission is crystal controlled so that synchronization with the receiver is easy. Transmission may be on a variety of frequencies yet be within federal communication regulations.

DESCRIPTION OF THE DRAWINGS

FIG. 5 is a block diagram of a suitable receiver;

FIG. 6 is a block diagram of a second embodiment of the signal generating identifier having a circuit which is activated by the receiver station; and FIG. 7 shows selected waveforms for the circuit of FIG. 6.

DESCRIPTION OF THE INVENTION

Figure 1:
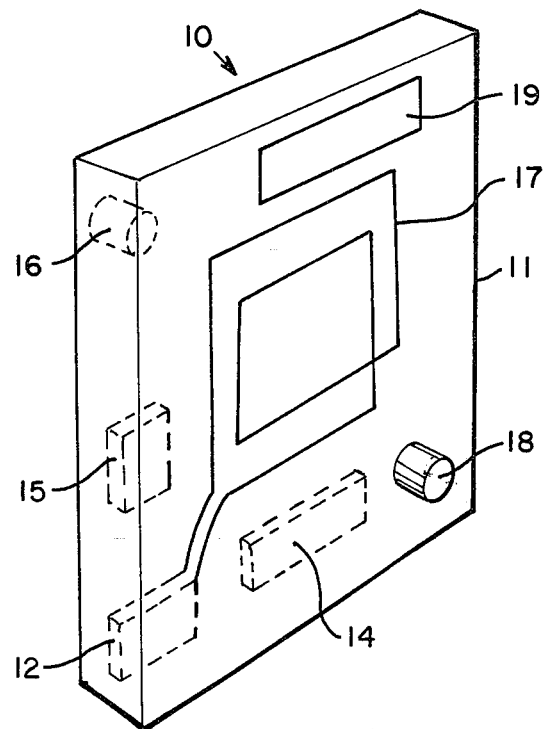
FIG. 1 is a perspective view of the signal generating identifier.

In FIG. 1 is shown a signal generating identifier 10 for use with the subject recognition system. This signal generator is housed in a case 11 preferably made of plastic and small enough to be easily carried. In general, there is included in the case an electronic circuit 12 connected with encoding switches 14 and a crystal signal generator 15. The circuitry is powered by a battery 16 to generate a signal which is transmitted to an antenna 17. Such signal generation is initiated by depressing a transmit button or switch 18. In addition there is provided a solar cell 19 connected in a manner to recharge the battery 16.

Figure 2:
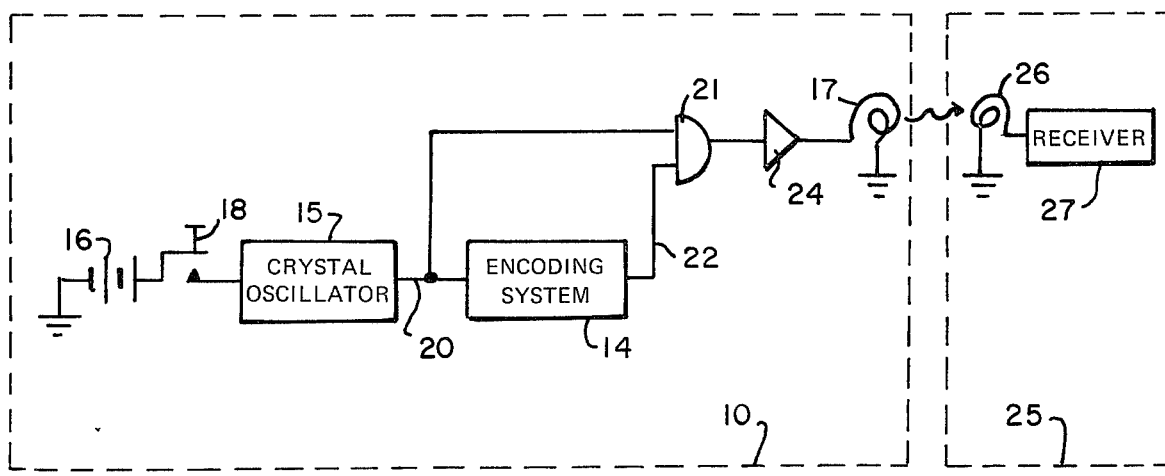
FIG. 2 is a block diagram of the identifier and the receiver.

Preferably the signal generator is small enough to fit within a pocket or to be attached to an object which it identifies. In a manner to be described later, the signal generator is programmable in a unique way such that each identifier can be recognized separately from all the other identifiers. The overall purpose of the identifier is to emit a signal which is distinguishable from all other signals from similar signal generators. Shown in FIG. 2 in block diagram form is the signal generating circuit. The circuit of the signal generator 10 is shown with the battery 16 and the actuating button 18 connected in series with the crystal oscillator 15. The oscillator provides a constant frequency signal which is transmitted through the conductor 20 to a gating system including an AND gate 21 and the encoding system 14. The AND gate 21 serves to transmit an encoded signal through the conductor 22 to an AND gate 21 for subsequent transmission through an amplifier 24 to the antenna 17 for radiation to a receiver 25 having an antenna 26 and a receiver circuit 27. The receiver circuit serves to decode and identify the signal. Thus by the depression of the button 18 a signal is generated and radiated by the transmitting antenna 17 in the manner described.

Figure 3:
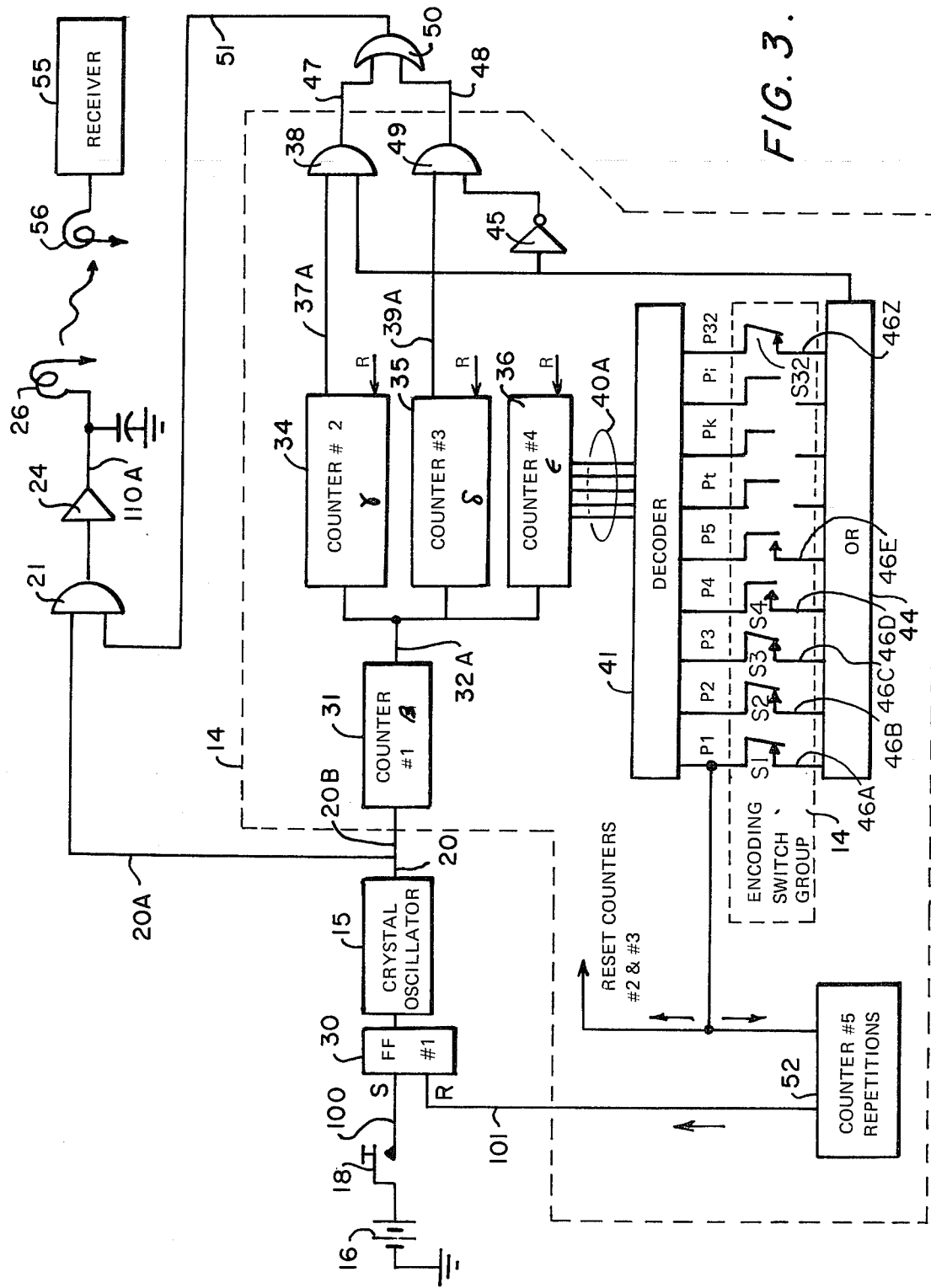
FIG. 3 is a detailed block diagram of the signal generator.

FIG. 3 is a detailed block diagram for the signal generator. The battery 16 is connected in series with the actuating button 18 connecting with a flip-flop circuit 30. Thus when the button 18 is energized, power is supplied to the crystal oscillator 15 in the manner previously described. The crystal oscillator emits a signal which is transmitted through the conductor 20 to the conductor 20A for transmission to the AND gate 21 in the manner previously described. Through the conductor 20B the same signal is transmitted to an encoding system 14 which will now be described in detail.

The encoding system 14 includes a first high-speed counter 31 which is able to follow the oscillator signal, which for this example has a frequency of 10 megahertz. Example values used in the following discussion are given in Table I.

TABLE I

Values of frequencies and periods used in the example described in this application are as follows:

| Frequency | Period | Value Of Division | Frequency Notation | Patent Appl Drawings | | |
|---|---|---|---|---|---|---|
| | | | | Block | Signal | Conductor |
| 10. MHZ | .1 microsec. | | $\alpha$ | 15 | 20 | 20 |
| | | 20:1 | | | | |
| 500. KHZ | 2. microsec. | | $\beta$ | 31 | 32 | 32A |
| | | 16:1 | | | | |
| 31.25 KHZ | 32 microsec. | | $\gamma$ | 34 | 37 | 37A |
| | | 24:1 | | | | |
| 20.83 KHZ | 48 microsec. | | $\delta$ | 35 | 39 | 39A |
| | | 512:1 | | | | |
| 976.5 cps | 1.024 millisec. | | $\epsilon$ | 36 | 40 | 40A |

Figure 4:
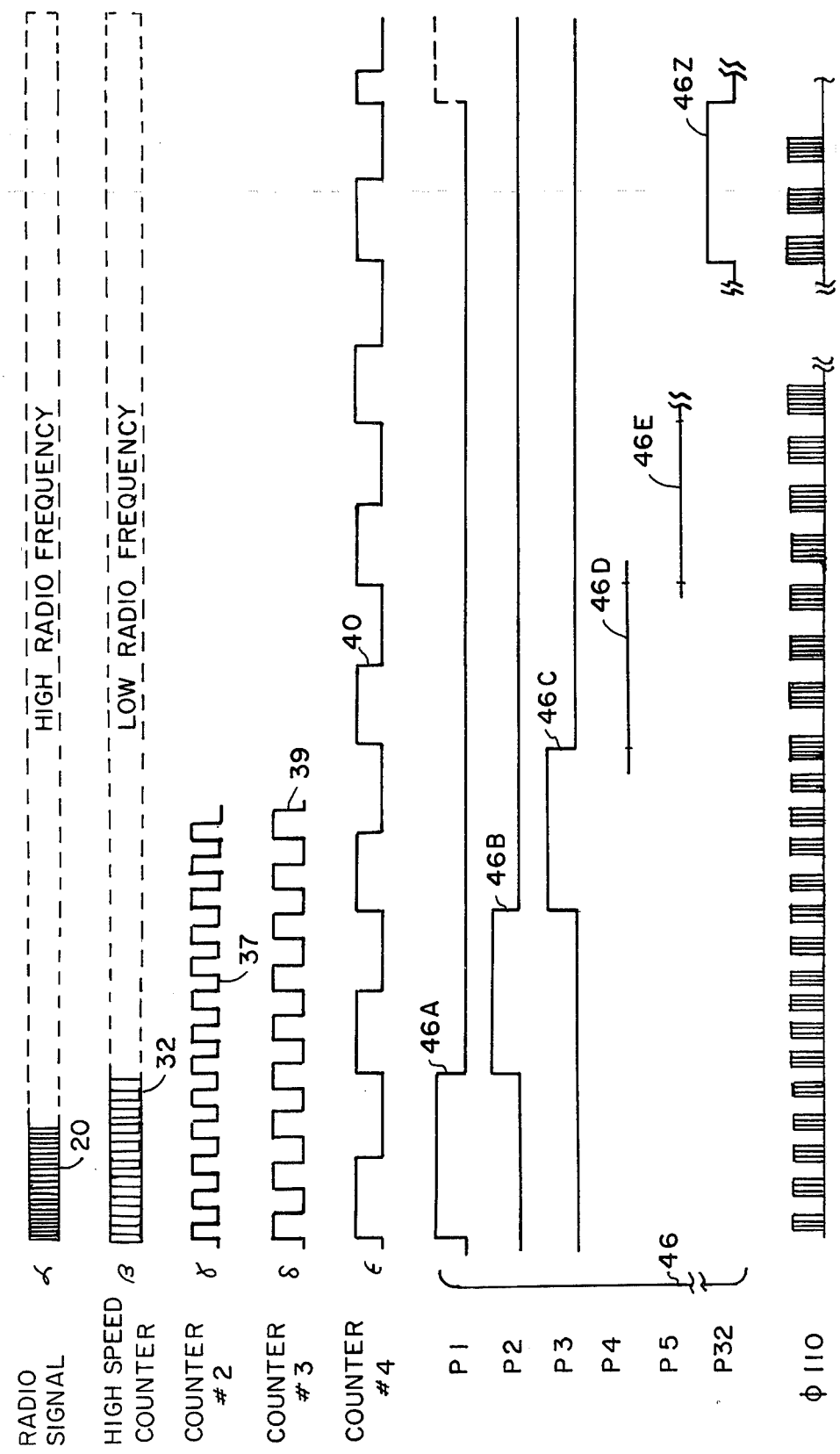
FIG. 4 shows selected waveforms from the circuit of FIG. 3.

Shown in FIG. 4 the signal 20 has a frequency in the radio frequency range. This signal is fed to the first high-speed counter 31 which thereafter transmits a signal 32 through the conductor 32 simultaneously to a second counter 34, a third counter 35 and a fourth counter 36 which generates respectively, third, fourth and fifth signals. Preferably the signal from the first counter 31 is in the frequency range of 500 kilohertz. The second counter divides this frequency by an integral value, such as 16, and emits a second signal 37 which has a period of 32 microseconds, through a conductor 37A to an AND gate 38. The third counter emits a third signal 39 through the conductor 39A which is the first signal divided by an integral value, such as 24 and has a period of 48 microseconds to an AND gate 49. The fourth counter preferably divides the first signal by 512 to generate a signal 40 with a period of 1024 microseconds which is transmitted through the group of conductors 40A to a decoder 41.

Thus the counters 34 and 35 each supply a signal to the AND gates 38 and 49 in a manner to be described later. Counter number four has the lowest frequency output and the five most significant bits in this counter are transmitted to the decoder 41. This decoder 41 expands these five parallel lines to the 32 output wires $P_1$ through $P_{32}$ by conventional decoding techniques well-known in the art. The output lines from the decode counter thereafter go through a plurality of switches $S_1$ through $S_{32}$ to an OR juncture 44. If $S_1$ to $S_{32}$ are mechanical switches the OR gate 44 may simply be a common terminal of all the switches, i.e. a solid wire. From the juncture 44 the signal goes to the AND gate 38 and through an inverter 45 to the AND gate 49. The switches $S_1$ through $S_{32}$ may be set permanently open or closed in accordance with a predetermined code. Thus these switches pass or do not pass a signal with the settings thereof, i.e. either open or closed, comprising a preselected code determining transmission through the AND gates 38 and 49. Either AND gate 38 or 49, but not both, are always able to pass a signal.

In operation the decoder 41 advances sequentially through the various positions of the output lines such that the lines $P_1$ through $P_{32}$ are successively energized. The output from these lines is transmitted respectively through the switches $S_1$ through $S_{32}$ and depending upon whether each switch is closed or open, there is transmitted a series of 1's or 0's in accordance with that setting. The bit rate of the signal transmitted from the decoder is the frequency of the signal emitted from the counter 36, or one bit each 1024 microseconds.

Thus if the switches are set as illustrated in the drawing, a signal 46A to 46Z is transmitted to each of the switches in succession. These signals open and close AND gates 38 and 49, so that there appears on the output conductors 47 and 48 of AND gates 38 and 49 signals from counters 34 and 35. The signals from the AND gates 38 and 49 are transmitted to the OR gate 50 and subsequently through the conductor 51 to AND gate 21. The AND gate 21 subsequently transmits to an amplifier 24 bursts of the output signal from the crystal oscillator 15. These bursts of signal are shown as signal 110 and are encoded in the form of two frequencies of period 32 and 48 microseconds in accordance with the coding of the switches $S_1$ through $S_{32}$. By the setting of these switches each signal that is transmitted differs in sequence from other signals having the switches set in a different code. Ordinarily these switches are set at the time of assembly of the signal generator and remain the same throughout the life of the identifier.

These are provided other components in the circuit such as a counter 52 which causes repeated transmission of the data before stopping radiation by resetting flip-flop 30. In this manner the coded signal is transmitted a preset number of repetitions with a single pressing of the button 18. In order that each transmission be identical, counters 34 and 35 are reset at the beginning of each transmission.

Shown in FIG. 5 is a typical receiver for detecting the signal generated by the signal generator of FIG. 3. Shown therein is the receiver 55 connected with the antenna 56 for receiving the identifier signal. The signal after being received by the antenna is fed through an RF amplifier 57 and a conventional detector 58 for generating a square wave representative of the bursts of signal. Thereafter the signal is amplified by the audio amplifier 59 and fed through parallel paths to the audio filters 60 and 61. These filters pass only the frequencies of counter 34 number two or counter 35 number three, respectively, with the output signals thereof being converted to a logic level by the rectifying circuit networks 62. Thereafter that signal is fed through an OR gate 64 to start a clock 65 which is equal in frequency to the counter 36 of the identifier. This clock supplies a clocking signal to one terminal of the AND gates 66 and 67 with the outputs from the audio filters being supplied to the respective other terminals. Thereafter the digital signal, i.e. 1's and 0's, is fed to a shift register 68 for storage and can be transmitted to a computer or memory (not shown) connected at the terminal 69.

Naturally there can be stored in any associated computer for table lookup the particular codes of each of the identifiers of the system. The coded value stored in the shift register is sent to the computer and a signal is fed to the computer calling for a table lookup of that particular code. When the computer finds the matching code, it can then enter its memory for associated data. For instance, in a credit transaction, it can authorize approval of a purchase, and with associated data can form a new credit balance.

From the foregoing description, it is apparent the identifier utilizes a single crystal oscillator which controls the radio frequency and the bit rate of the coding of the radio frequency signal. In addition the modulation frequencies of the output signals are derived directly from the oscillator output signal, thereby rendering a simplified circuit. The transmission can be easily encoded merely by setting selected ones of a set of switches open and closed. By use of a single oscillator the circuit is simplified and the output signals are always the same exact frequency relationship because of being derived from the single oscillator signal.

In FIG. 6 is still another modification of the invention just described wherein the identifier is triggered automatically to transmit the code by a signal received from the receiving station 25. Such a feature does away with the need to initiate transmission by the pressing of the button 18 in the previous embodiment. This system is especially usable wherein the identifier is fixed to an object rather than carried by an individual, or when the button is not readily reachable, such as when the circuit is covered by the wallet or pocketbook.

In this embodiment there is included in the identifier 10 a simple receiver connected with the output antenna 26. A capacitor 72 roughly tunes the antenna to a command frequency. This command frequency is generated in a suitable circuit within the receiving station (not shown). The signal received is amplified in the amplifier 74 having as a load the inductor 75 and the capacitor 76 providing additional frequency selectivity. Preferably this signal is in the radio frequency range and is detected by the diode 77 and the capacitor 78. The command frequency is repeated regularly with a modulation frequency of 976.5 hertz having a period of 1024 microseconds and is repeated 33 times per second or once every 32 milliseconds.

The resulting wave shape at line 79 is shown as the signal 80 in FIG. 7. This signal passes through the OR gate 81 and sets the flip-flop 30A. As a result the crystal oscillator 15A is started and the high speed counter 31A runs to remit a pulsed wave every 1024 microseconds or any other selected time. This output waveform is the waveform 86 of FIG. 7. For a normal response to a request signal, the signals 80 and 86 rise and fall together thus energizing the AND gate 87. As a result the counter 88 is caused to advance typically for a count of 8 so that after 8 coincidences of the signals, the output signal on line 89 goes positive. As a result the line 90 goes positive, the AND gate 91 is opened and a signal through the conductor 32A starts the advances of counters 34, 35 and 36 of the identifier shown in FIG. 3. Also the line 90 in going positive enables the AND gate 21A so that radiation from the identifier will be initiated. A reset signal from counter 52 of the identifier resets the flip-flop 95 by supplying a signal which is conducted through the conductor 101B and terminates identifier radiation after a preset quantity of emissions as previously described under FIG. 3.

The counter 88 requires a count of 8 or more before transmission occurs to avoid spurious signals from triggering such transmission and thereby reducing battery life and perhaps inadvertent revelation of the identifier code by a premature signal. Certain types of sustained noise might cause undesired transmission and more sophisticated recognition components can be built into the system as is well-known in the art. Conversely the system preferably cannot be too difficult to trigger or noise bursts might prevent response as desired. The closer the antennas 26 and 56 of the identifier and receiver are positioned, the less noise is a factor in the transmission.

A variation of the device could include a separate crystal (not shown) for the radio frequency radiation and for the modulation and bit rates. The gating of the R.F. signal would be by the same type of gate previously described and the bit rate would be crystal controlled; the two would no longer be exact multiples of one another and the cost of the unit would be increased somewhat.

Choice of Frequencies, FCC Regulations, Design, and Power Levels

The Federal Communications Commission states the power levels tolerated for various radio frequency services. This invention deals with a radio frequency service not of the conventional type for voice, music and code, in which long distance communication is an important objective, but rather this application deals with a radio frequency device of uniquely short range by communication standards. Further, it operates at power levels below the threshold levels specified by the FCC as Radio Frequency Devices. This low power allows some unexpected and valuable device simplifications.

The FCC specifications covering Radio Frequency Devices are stated in their regulations (present in Volume II, part 15). The radiation levels specified by the FCC are extracted and tabulated in Table II as follows. The symbol uV/m stands for "microvolts per meter" and measures field strength. The field strength is typically specified as a maximum value at a certain distance from the device producing the radiation, and is given in meters indicated by the symbol M. MHZ stands for a frequency, in Megahertz.

TABLE II

| | Table of Allowed Radiation Levels | | |
| --- | --- | --- | --- |
| | Frequency Band, in MHZ | Allowed Power in Band uV/m | Allowed Power Outside of Band uV/m |
| Wireless Microphone | 88–100 | 50 uV/m @ 15M | 40 uV/m @ 3M |
| Telemetering | 38–41 | 10 uV/m @ 15M | 10 uV/m @ 3M |
| Material Measurements | 13,27,40,900 @ 30M | 15,32,50,500 @ 30M | .5,1.0,1.5,15 @ 30M |
| Radio Control For Garage Door Openers | 70–470 | 125 to 1250 (linear interpolation) @ 30M | 15 uV/m @ 1M |
| Field Disturbance | Any | 15 uV/m | same, i.e. |

TABLE II-continued
Table of Allowed Radiation Levels

| | Frequency Band, in MHZ | Allowed Power in Band uV/m | Allowed Power Outside of Band uV/m |
| --- | --- | --- | --- |
| Sensors | | @ λ/2 π<br>λ = wavelength | 15 uV/m<br>@ λ/2π |

Note:
There are similar allowances for Cable TV and other services.

Note, in Table II, first, that the allowed levels and distances are extremely low by communication standards-they are chosen to practically eliminate interference with communication systems. Note secondly, that radiation outside the specified bands is allowed but only minimally allowed. The radiation outside the band is typically called "spurious radiation" and is generally caused by harmonics of the fundamental transmission frequency and by sidebands. This spurious radiation is typically reduced by adding circuit components to (a) suppress harmonics, usually by several stages of tuned radio frequency circuits, and to (b) suppress sideband radiation, usually by allowing only sine wave modulation in preference to square wave modulation, said sine wave modulation being obtained by audio frequency tuned circuits.

It is a particular quality of the subject device that the power level is unusually low, so that its radiation field falls within the power levels allowed in the righthand column of Table II, "Allowed Power Outside of Frequency Band". The penalty or disadvantage of operating at less than three meters is acceptable for this device. Further, all harmonics, sidebands and spurious radiations have less power than the fundamental radiation and are thereby allowed under the regulations, and subsequently the subject device is unexpectedly simple in design and can be manufactured considerably more economically than if considerable and habitual attention must be given to controlling spurious radiation. The auxiliary parts for suppression of unwanted radiation are not needed.

The invention claimed:

1. An electronic identification system for identifying signal generating objects, comprising in combination:
   a portable identifier including means to repeatedly generate an identification signal having predetermined characteristics of frequency and pulse length;
   a detector for identifying said identifier comprising:
   an antenna network for receiving said identification signal;
   means to record said signal and compare it with a known signal to determine the identification of the identifier;
   means to indicate whether or not the said identification signal is one having predetermined characteristics;
   said identifier including a constant frequency signal generator and means to gate said constant frequency signal to generate said identification signal including means to divide said constant frequency signal by a predetermined constant to generate a derivative signal; and
   said means to gate said constant frequency signal acting responsive to said derivative signal.

2. An electronic identification system as defined in claim 1 wherein said means to divide said constant frequency signal includes at least one counter; and a gate connected to receive said derivative signal and said constant frequency signal and transmit said constant frequency signal responsive to the presence of said derivative signal.

3. An electronic identification system for transmitting separate identifier identification signals comprising, in combination:
   a portable identifier including:
   an oscillator for generating a constant frequency signal;
   coding circuit means for receiving said constant frequency signal and for generating a plurality of derivative signals by dividing said constant frequency signal by predetermined constants;
   a gating circuit receiving said constant frequency signal and said derivative signals and including means for transmitting an identification signal comprising pulses of said constant frequency signal responsive to said derivative signals in predetermined sequence.

4. An electronic identification system as defined in claim 3 wherein said coding circuit includes first and second counters for generating said derivative signals by dividing the constant frequency signal by preselected constants.

5. An electronic identification system as defined in claim 4 including a third counter for generating a series of repetitive pulsed signals and switching and gating means for transmitting said derivative signals reponsive to the pulsed signals.

6. An electronic identification system as defined in claim 5 wherein said switching means includes a plurality of switches which can be preset to encode the pulsed signal.

7. An electronic identification system as defined in claim 6 wherein said gating means includes a plurality of gates each receiving one of said derivative signals and said encoded pulsed signal for transmitting said derivative signals in alternating sequence responsive to said pulsed signal to form the identification signal.

8. An electronic identification system as defined in claim 7 wherein said gating means includes a gate connected to receive said derivative signals from said plurality of gates and said constant frequency signal for transmission of the constant frequency signal responsive to the derivative signals as the identification signal.

9. An electronic identification system for identifying separate identifiers, comprising, in combination:
   a portable signal generating identifier including:
   an oscillator for generating a constant frequency signal;
   a primary counter connected to receive said oscillator signal and divide the signal by a first constant to generate a first signal of lower frequency than the oscillator signal;
   second, third and fourth counters connected to receive said first signal and each divide the first signal by a respective constant to generate second, third and fourth signals of varying frequencies lower in frequency than the first signal;

a gating system connected to receive said constant frequency signal and said second, third and fourth signals and including means to transmit said constant frequency signal intermittently responsive to said second, third and fourth signals to form an identification signal; and a receiver receiving said identification signal including means for comparing and signaling when the identification signal corresponds to a predetermined signal.

10. An electronic identification system as defined in claim 9 wherein said gating system includes a plurality of settable switches for serially encoding said fourth signal.

11. An electronic identification system as defined by claim 10 including first and second gates for receiving said second and third signals, respectively, said first and second gates being connected to receive said fourth signal and transmit said second and third signals responsive to the encoded fourth signal.

12. An electronic identification system as defined in claim 11 wherein said first and second gates are connected to transmit alternately said second and third signals responsive to said fourth signal.

13. An electronic identification system as defined in claim 12 including a third gate connected to receive said second and third signals transmitted by said first and second gates, and to receive and transmit a fourth signal responsive to the first and second gate to form the identification signal.

* * * * *